US012789368B2

(12) United States Patent
Chen et al.

(10) Patent No.: US 12,789,368 B2
(45) Date of Patent: Nov. 10, 2026

(54) ROBOTIC ARM AND CONTROL METHOD THEREOF

(71) Applicant: TECHMAN ROBOT INC., Taoyuan City (TW)

(72) Inventors: Chun-Yu Chen, Taoyuan City (TW); Shih-Wei Wang, Taoyuan City (TW)

(73) Assignee: TECHMAN ROBOT INC., Taoyuan City (TW)

( * ) Notice: Subject to any disclaimer, the term of this patent is extended or adjusted under 35 U.S.C. 154(b) by 0 days.

(21) Appl. No.: 19/203,923

(22) Filed: May 9, 2025

(65) Prior Publication Data

US 2025/0262763 A1 Aug. 21, 2025

Related U.S. Application Data

(62) Division of application No. 18/136,828, filed on Apr. 19, 2023, now Pat. No. 12,589,492.

(30) Foreign Application Priority Data

Oct. 28, 2022 (TW) ................................. 111141491

(51) Int. Cl.

| | |
|---|---|
| ***B25J 9/16*** | (2006.01) |
| ***B25J 9/02*** | (2006.01) |
| ***B25J 13/06*** | (2006.01) |

(52) U.S. Cl.

CPC ............... *B25J 9/163* (2013.01); *B25J 9/023* (2013.01); *B25J 9/1651* (2013.01); *B25J 9/1694* (2013.01); *B25J 13/06* (2013.01)

(58) Field of Classification Search

CPC . B25J 9/163; B25J 9/023; B25J 9/1651; B25J 9/1694; B25J 13/06; B25J 9/1664; B25J 13/085; B25J 13/088; B25J 18/00; B25J 13/00; G05B 19/423

See application file for complete search history.

(56) References Cited

U.S. PATENT DOCUMENTS 4,442,387 A * 4/1984 Lindbom ............... B25J 9/0081 901/17
5,956,465 A * 9/1999 Takagi ............. G05B 19/41815 700/250
9,592,608 B1 3/2017 Bingham et al.

(Continued)

OTHER PUBLICATIONS

Fanny Ficuciello et al., Variable Impedance Control of Redundant Manipulators for Intuitive Human-Robot Physical Interaction, IEEE Transactions on Robotics, Aug. 2015, 15 Pages, DOI: 10.1109/TRO.2015.2430053.

(Continued)

*Primary Examiner* — Adam R Mott
*Assistant Examiner* — Sagar KC
(74) *Attorney, Agent, or Firm* — Innovation Counsel LLP

(57) ABSTRACT

A control method of a robotic arm is provided. The control method includes: setting a detection circuit, a comparing circuit and a switching circuit. The detection circuit detects the motion of the robotic arm to generate a detection signal. The comparing circuit compares the detection signal with a low threshold region and compares the detection signal with a high threshold region to generate a comparison signal. The switching circuit switches the robotic arm to a first motion mode or a second motion mode according to the comparison signal.

4 Claims, 8 Drawing Sheets

(56) References Cited

U.S. PATENT DOCUMENTS

| | | | | |
|---|---|---|---|---|
| 11,654,576 | B2 | 5/2023 | Gu et al. | |
| 12,233,487 | B2 * | 2/2025 | Davidson | B23K 9/0956 |
| 2013/0030569 | A1 | 1/2013 | Fudaba et al. | |
| 2016/0144513 | A1 * | 5/2016 | Fukunaga | G05B 19/409 901/5 |
| 2016/0361125 | A1 | 12/2016 | Balicki et al. | |
| 2018/0310908 | A1 * | 11/2018 | Xiao | A61B 6/54 |
| 2019/0358812 | A1 * | 11/2019 | Motoyoshi | B25J 9/1633 |
| 2021/0068907 | A1 * | 3/2021 | Fuerst | A61B 34/25 |
| 2021/0353495 | A1 * | 11/2021 | Shen | E04F 11/1863 |
| 2022/0110705 | A1 | 4/2022 | Hourtash et al. | |
| 2022/0388156 | A1 * | 12/2022 | Hansen | G05B 19/423 |

OTHER PUBLICATIONS

Non-Final Office Action mailed Sep. 30, 2025, issued in corresponding U.S. Appl. No. 18/136,828, filed Apr. 19, 2023, 16 pages.

* cited by examiner

ROBOTIC ARM AND CONTROL METHOD THEREOF

This is a divisional application of co-pending U.S. application Ser. No. 18/136,828 filed on Apr. 19, 2023, which claims the benefit of Taiwan application Serial No. 111141491 filed on Oct. 28, 2022, the subject matter of which is incorporated herein by reference.

BACKGROUND OF THE INVENTION

Field of the Invention

The invention relates in general to a robotic arm, and more particularly to a control method of a robotic arm.

Description of the Related Art

In most teaching methods of a robotic arm, after the operator manually operates the teaching device, the teaching device outputs signals to the controller of the robotic arm, then the controller controls the robotic arm to move in the X/Y/Z directions of a coordinate system to perform translational movement, rotational movement, or axial joint rotation.

The most commonly seen operation interface of the teaching device of a robotic arm can be a physical key or a software button. To operate the six axes of the robotic arm, at least 12 buttons are needed. The 12 buttons include operation keys for performing translation and rotation on the X/Y/Z axes and switch buttons for switching between inch movement and continuous movement on the X/Y/Z axes. To teach the robotic arm, the operator needs to watch each button of the teaching device. The operator's line of sight must frequently shift between the robotic arm and the teaching device. Such teaching method deteriorates the teaching efficiency of the robotic arm.

In most intuitive teaching methods of a robotic arm, after the operator manually drags the force sensors on the 6 axes of the robotic arm, the force sensors output signals to the controller of the robotic arm, then the robotic arm accordingly performs translational movement, rotational movement or axial joint rotation move in the X/Y/Z directions of the coordinate system.

Although the teaching device can provide more operation settings, the operation of the teaching device is complicated, and the teaching device is heavy. Furthermore, as disclosed above, on-site adjustment requires the operator to frequently shift the line of sight between the target object and the teaching device, and therefore cannot be focused on teaching. Besides, despite that the force sensors on the 6 axes can make the operation more intuitive, when it comes to fine-tuning (such as 1 mm pitch), manual dragging may easily overdo and cannot be precisely positioned. Therefore, the present invention provides a control method of a robotic arm for simplifying the teaching process and increasing the accuracy.

SUMMARY OF THE INVENTION

The present invention is directed to provide a control method of a robotic arm, which simplifies the teaching process for the operator.

The present invention is directed to provide a control method of a robotic arm, which increases teaching accuracy.

To achieve the above objects of the present invention, a control method of a robotic arm is provided. The control method includes setting a detection circuit, a comparing circuit and a switching circuit. The detection circuit detects the motion of the robotic arm to generate a detection signal. The comparing circuit compares the detection signal with a low threshold region and compare the detection signal with a high threshold region to generate a comparison signal. The switching circuit switches the robotic arm to a first motion mode or a second motion mode according to the comparison signal.

The control method of the robotic arm according to the present invention includes setting a teaching device, a detection circuit, a comparing circuit and a switching circuit. The teaching device includes a forward button, a reverse button and a cycle switch button. The detection circuit detects an output of teaching device to generate a detection signal. The comparing circuit compares the detection signal with a low threshold region and compares the detection signal with a high threshold region to generate a comparison signal. The switching circuit switches the robotic arm to the first motion mode or the second motion mode according to the comparison signal.

Wherein the detection circuit is an encoder, the detection signal is a speed signal, and the detection circuit detects the motion speed of the robotic arm to generate the detection signal; when the comparing circuit determines that the detection signal is at the low threshold region, the switching circuit switches the robotic arm to the first motion mode; when the comparing circuit determines that the detection signal is at the high threshold region, the switching circuit switches the robotic arm to the second motion mode.

The first motion mode is a discontinuous movement or a low-speed motion, and the second motion mode is a continuous movement or a high-speed motion.

The above and other aspects of the invention will become better understood with regard to the following detailed description of the preferred but non-limiting embodiment(s). The following description is made with reference to the accompanying drawings.

DETAILED DESCRIPTION OF THE INVENTION

The technical methods adopted to achieve the above objects of the present invention and the consequent effects are disclosed in a number of embodiments below with reference to the accompanying drawings.

Figure 1:
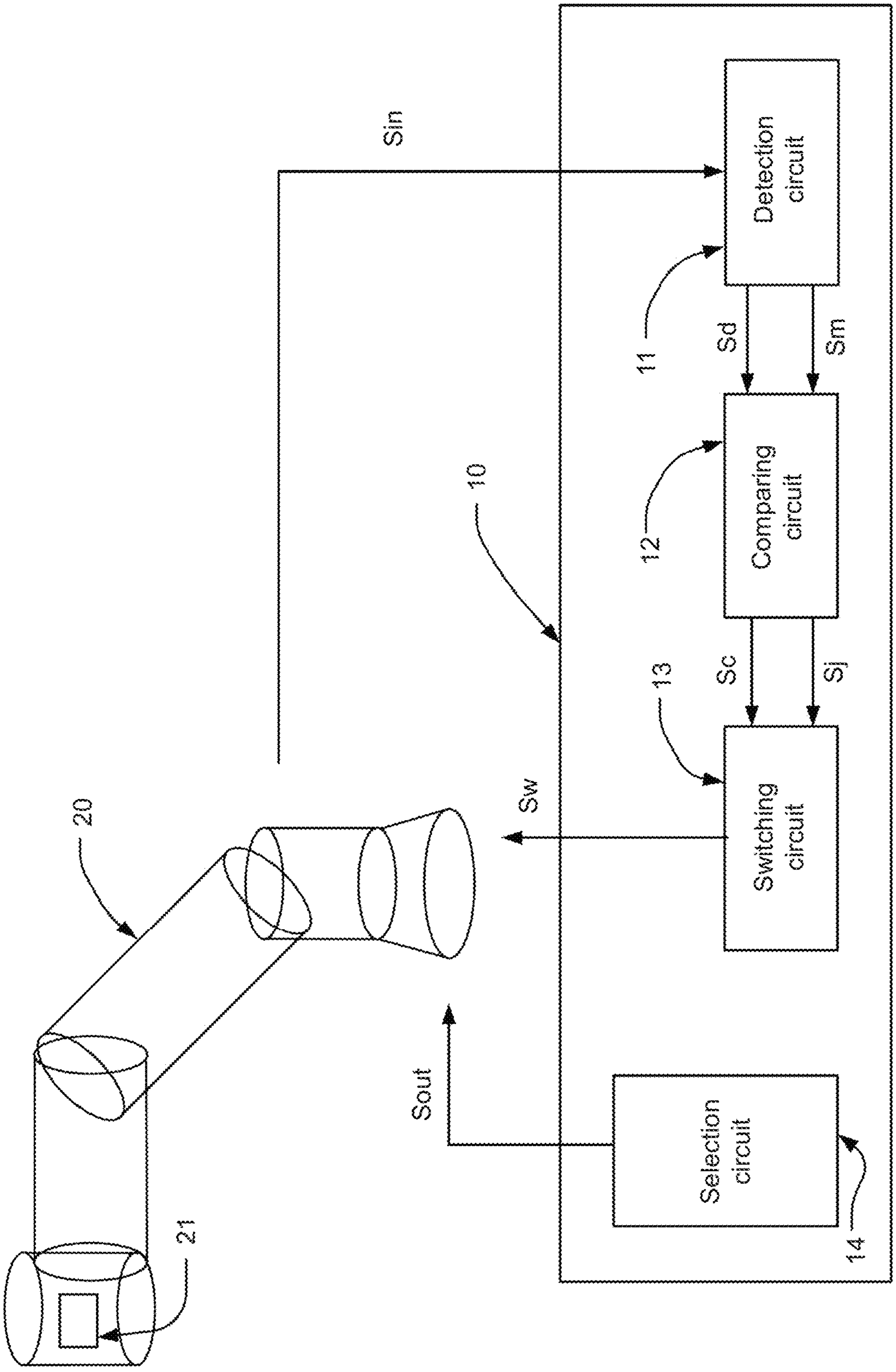
FIG. 1 is a schematic diagram of a robotic arm and a controller according to the present invention.

Referring to FIG. 1, a schematic diagram of a robotic arm and a controller according to the present invention is shown. A controller 10 and a robotic arm 20 are connected to each other. For instance, the controller 10 is connected with a joint module of the robotic arm 20. The controller 10 controls the motion of the robotic arm 20. The controller 10 receives an input signal Sin according to the output of the robotic arm 20 and generates a switch signal Sw or an output signal Sout according to the input signal Sin, so as to control the robotic arm 20 to perform different modes of motion. Thus, with respect to the motion mode of the robotic arm 20, the operator can make selection through an interface setting to generate the output signal Sout to control the robotic arm 20 to move according to a specific motion mode. In the embodiment of FIG. 1, the output signal Sout is generated by a selection circuit 14 of the controller 10. In other words, the interface setting can set the selection circuit 14 to generate different output signals Sout to control the robotic arm 20 to perform different motion modes.

Or, the control method of the robotic arm 20 may include setting a detection circuit 11, a comparing circuit 12 and a switching circuit 13. The detection circuit 11 detects the motion of the robotic arm 20 to generate a detection signal Sd. The comparing circuit 12 compares the detection signal Sd with a low threshold region and compares the detection signal Sd with a high threshold region to generate a comparison signal Sc. The switching circuit 13 switches the robotic arm 20 to a first motion mode or a second motion mode according to the comparison signal Sc.

Figure 2:
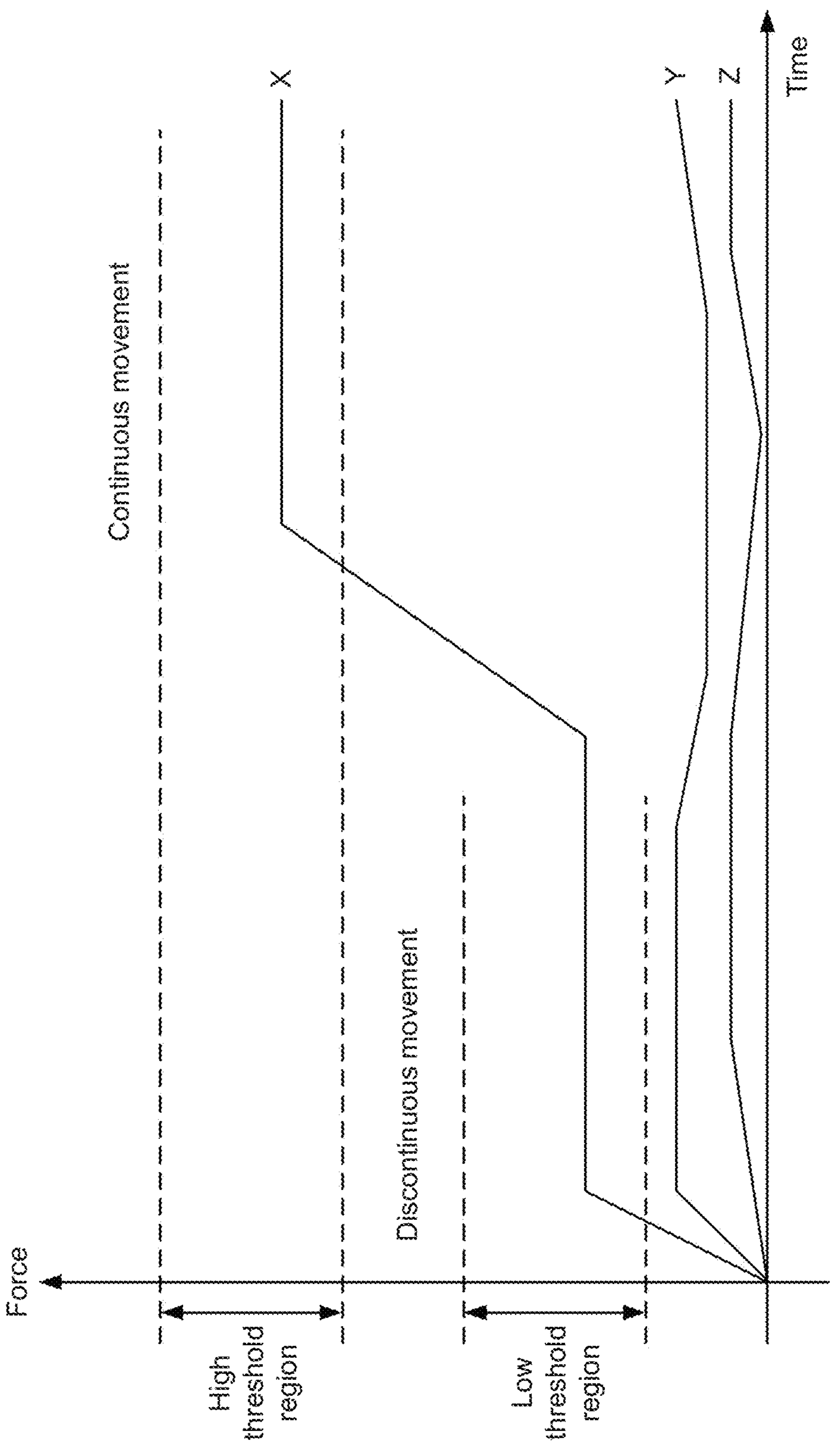
FIG. 2 is a first waveform of teaching the robotic arm by an external force according to the present invention.

Referring to FIG. 2, a first waveform of teaching the robotic arm by an external force according to the present invention is shown. The detection circuit 11 may include a force sensor 21 shown in FIG. 1, so that the detection signal Sd can be a force signal, wherein the robotic arm 20 can be equipped with six sets of force sensors 21. The motion of the robotic arm 20 on different axes may include an X-axis movement X, a Y-axis movement Y and a Z-axis movement Z, so that the detection circuit 11 can detect three motion types of the robotic arm 20 to generate a motion signal Sm for respective motion type. When an external force is applied to control the robotic arm 20 to move on the X-axis, the detection circuit 11 detects that the force value of the X-axis movement X is larger than that of the Y-axis movement Y and the Z-axis movement Z shown on FIG. 2. After the detection circuit 11 generates the motion signals Sm for three motion types, the comparing circuit 12 determines that the level of the motion signal Sm of the X-axis movement X is higher than the levels of the motion signals Sm of the Y-axis movement Y and the Z-axis movement Z and generates a determination signal Sj as indicated in FIG. 1.

Meanwhile, the switching circuit 13 fixes (or switches) the robotic arm 20 to the X-axis movement X according to the determination signal Sj. When the external force continues to control the robotic arm 20, the detection circuit 11 detects the X-axis movement X of the robotic arm 20 to generate the detection signal Sd. As indicated in FIG. 2, when the comparing circuit 12 determines that the detection signal Sd is at the low threshold region, the switching circuit 13 switches the robotic arm 20 to a first motion mode; when the comparing circuit 12 determines that the detection signal Sd is at the high threshold region, the switching circuit 13 switches the robotic arm 20 to a second motion mode. In other words, the controller 10 firstly obtains the axial direction in which the operator intends to operate, then determines the operator's desired accuracy and automatically adjusts the motion amount of the robotic arm 20.

Refer to FIG. 2 again. The first motion mode is a discontinuous movement, and the second motion mode is a continuous movement. The discontinuous movement refers to inch movement, that is, the minimal movement unit by which the robotic arm 20 moves each time. For instance, if the minimal movement unit of the robotic arm 20 is designed as 1 mm, the robotic arm 20 performs inch movement for the first time, that is, the robotic arm 20 moves by 1 mm then halts. If the detection circuit 11 (that is, the force sensor 21) continuously detects the movement pushed by the external force, the robotic arm 20 performs inch movement for the second time to move by 1 mm again. The continuous movement is different from the discontinuous movement in that the continuous movement refers to the robotic arm 20 continuously moving in a specific direction without halting. Thus, the detection circuit 11 allows the operator to directly teach the robotic arm 20 to move and perform an inch movement or a continuous movement without having to frequently shifting the line of sight between the robotic arm 20 and the operating interface.

Figure 3:
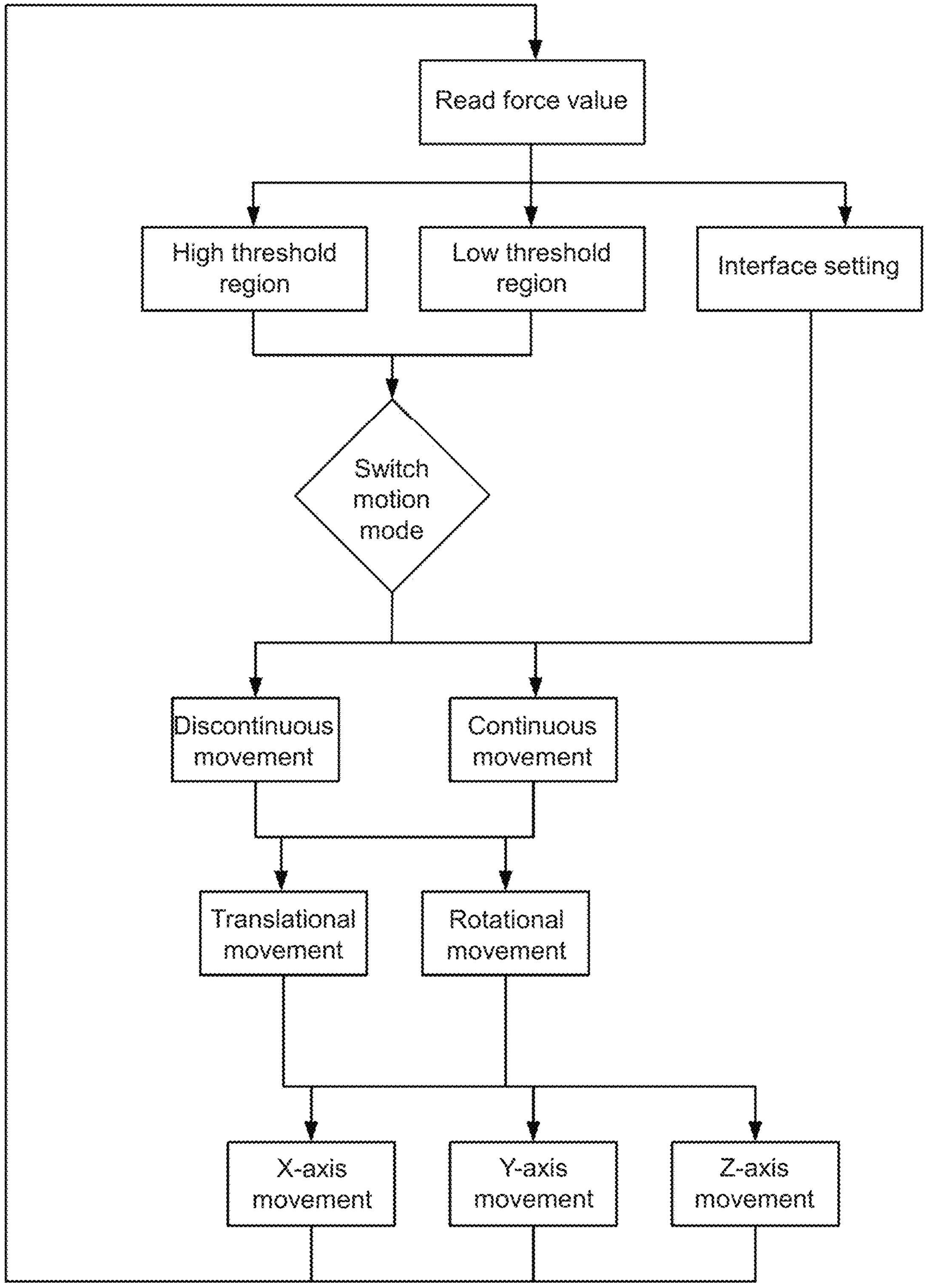
FIG. 3 is a first flowchart of a method for controlling the motion mode of the robotic arm according to the present invention.

Referring to FIG. 3, a first flowchart of a method according to the present invention for controlling the motion mode of the robotic arm is shown. After reading a force value detected by the force sensor 21, the comparing circuit 12 determines whether the force value is at the low threshold region or the high threshold region for the switching circuit 13 to switch the motion mode of the robotic arm 20 according to the force value, wherein the robotic arm 20 can switch to a translational movement or rotational movement with discontinuous movement or a translational movement or rotational movement with continuous movement. Take the X-axis movement X of FIG. 2 for instance. The switching circuit 13 can switch the robotic arm 20 to perform the X-axis movement X with discontinuous movement and continuous movement according to different force values. Besides, if the operator intends to control the robotic arm 20 to perform translational movement or rotational movement, the detection circuit 11 can also be used to detect the force value for the switching circuit 13 to perform switching according to the detection result. Therefore, if the detection result is that the force value is small and the operator performs translational movement, the switching circuit 13 switches the robotic arm 20 to perform the X-axis movement X which is discontinuous and translational. Then, the controller 10 can repeatedly detect whether the control of the robotic arm 20 by the external force has changed to the Y-axis movement Y or the Z-axis movement Z.

Also, when the force value is not at the low threshold region or the high threshold region, the operator can set the output signal Sout generated by the selection circuit 14 through interface setting and control the robotic arm 20 to perform a specific motion mode. For instance, when the force value is between the low threshold region and the high threshold region, the motion mode can be set to the X-axis movement X, which is continuous and rotational; or when the force value is lower than the low threshold region, the motion mode can be set to the X-axis movement X, which is discontinuous and translational. Or, the force value can be divided into a low threshold region and a high threshold region only. That is, whatever force value above the high threshold region (inclusive of the high threshold region) belong to continuous movement, and whatever force value below the high threshold region (exclusive of the high threshold region) belong to discontinuous movement. Thus, there is no need to provide additional interface setting for the operator to perform manual setting. When the operator applies a larger force (such as the high threshold region), this indicates that the operator intends to perform a larger range of motion. When the operator applies a smaller force (such as the low threshold region), this indicates that the operator wants to perform a smaller range of motion. The setting of threshold (or threshold region) depends on actual needs and is not limited by the exemplification of embodiments.

Figure 4:
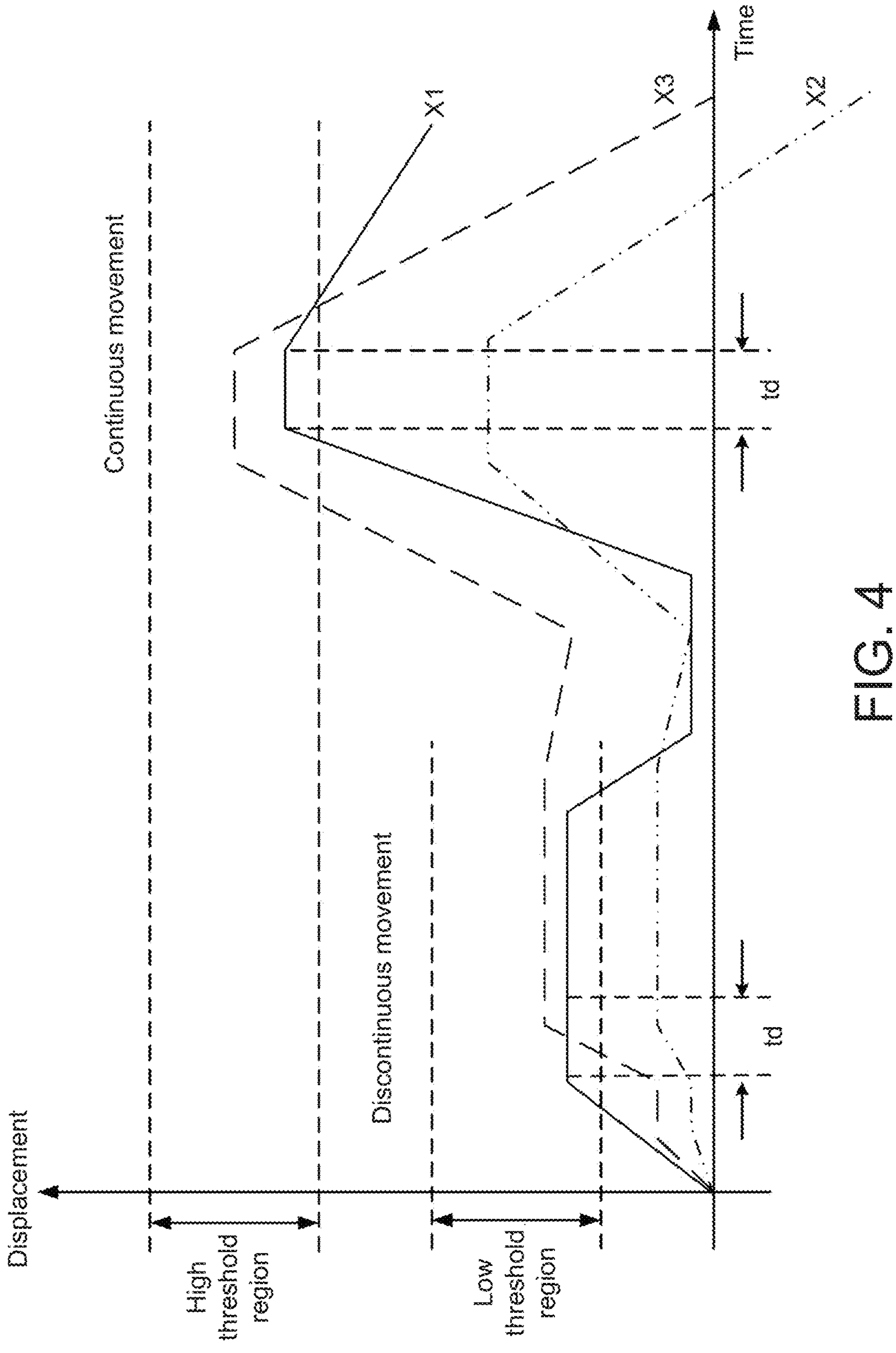
FIG. 4 is a second waveform of teaching the robotic arm by an external force according to the present invention.

Referring to FIG. 4, a second waveform of teaching the robotic arm by an external force according to the present invention is shown. When the robotic arm 20 is not provided with any force sensor 21, the detection circuit 11 may include an encoder and a computational circuit. Thus, the detection signal Sd can be a displacement signal, that is, the displacement signal is relevant to the amount of rotation of the encoder, and the amount of rotation of the encoder is relevant to the displacement of the robotic arm 20. Therefore, after the detection circuit 11 continuously detects the displacement X1 of the X-axis movement X of the robotic arm 20 for a detection time td, the displacement X2 is obtained from the displacement X1 through a differential calculation and an absolute value calculation, the displacement X3 is obtained from the displacement X2 through an integral calculation. Lastly, the detection circuit 11 generates the detection signal Sd according to the displacement X3. Moreover, when the comparing circuit 12 determines that the detection signal Sd is at the low threshold region, the switching circuit 13 switches the robotic arm 20 to the first motion mode; when the comparing circuit 12 determines that the detection signal Sd is at the high threshold region, the switching circuit 13 switches the robotic arm 20 to the second motion mode.

Figure 5:
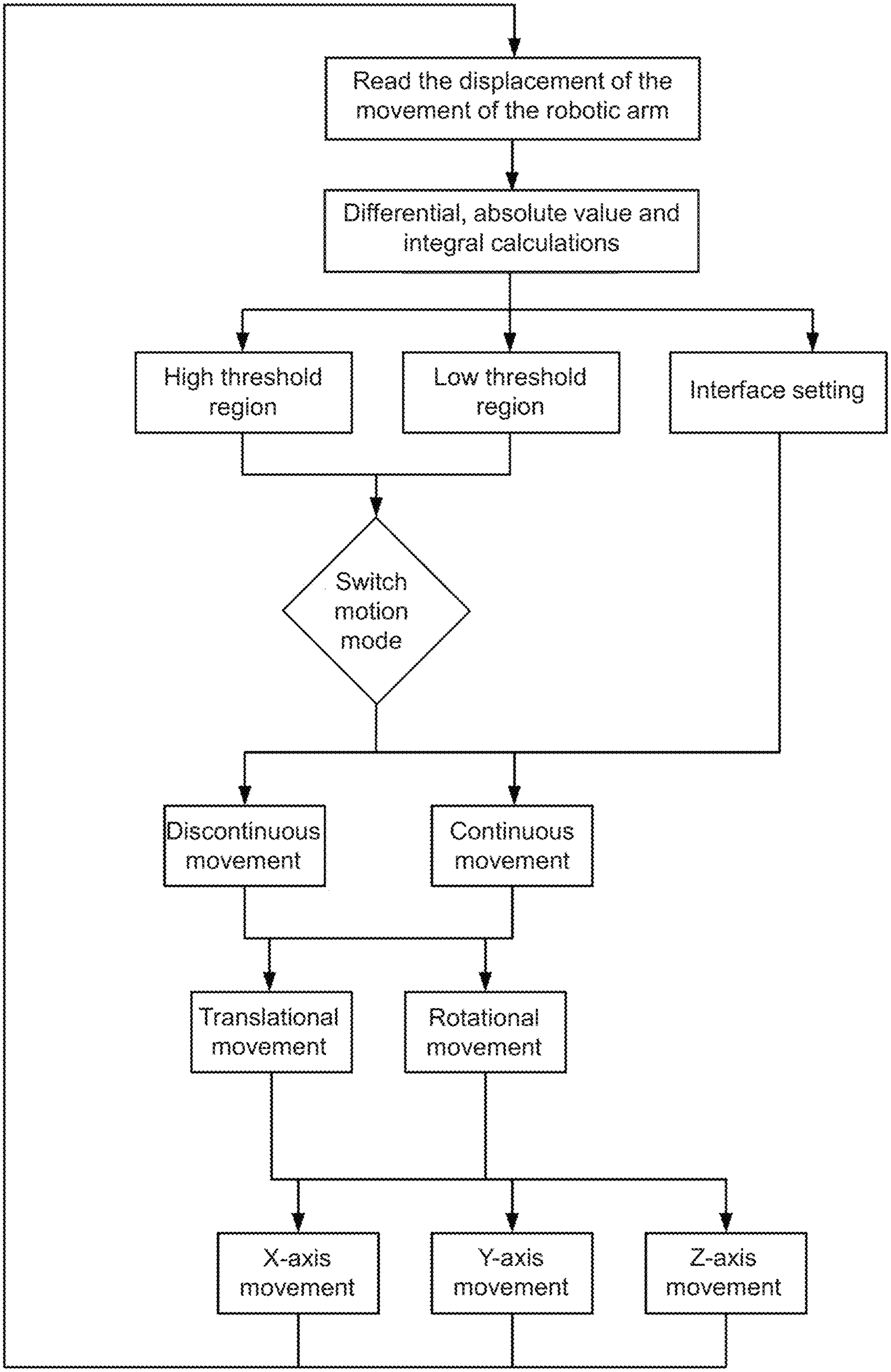
FIG. 5 is a second flowchart of a method for controlling the motion mode of the robotic arm according to the present invention.

Referring to FIG. 5, a second flowchart of a method for controlling the motion mode of the robotic arm according to the present invention is shown. As indicated in the diagrams, the embodiments of FIGS. 4-5 are different from the embodiments of FIGS. 2-3 in that the embodiments of FIGS. 4-5 are not provided with the force sensor 21 and the displacement of the X-axis movement X is calculated by the computational circuit of the detection circuit 11 to generate the detection signal Sd. Similarly, the comparing circuit 12 compares the low threshold region and the high threshold region according to the detection signal Sd and then generates the comparison signal Sc for the switching circuit 13 to set the motion mode for the robotic arm 20. Therefore, without the force sensor 21, the operator can operate the inch movement or continuous movement of the robotic arm 20 without shifting the line of sight. Remaining technologies of the embodiments of FIGS. 4-5 are similar to that of the embodiments of FIGS. 2-3, and the similarities are not repeated here.

Figure 6:
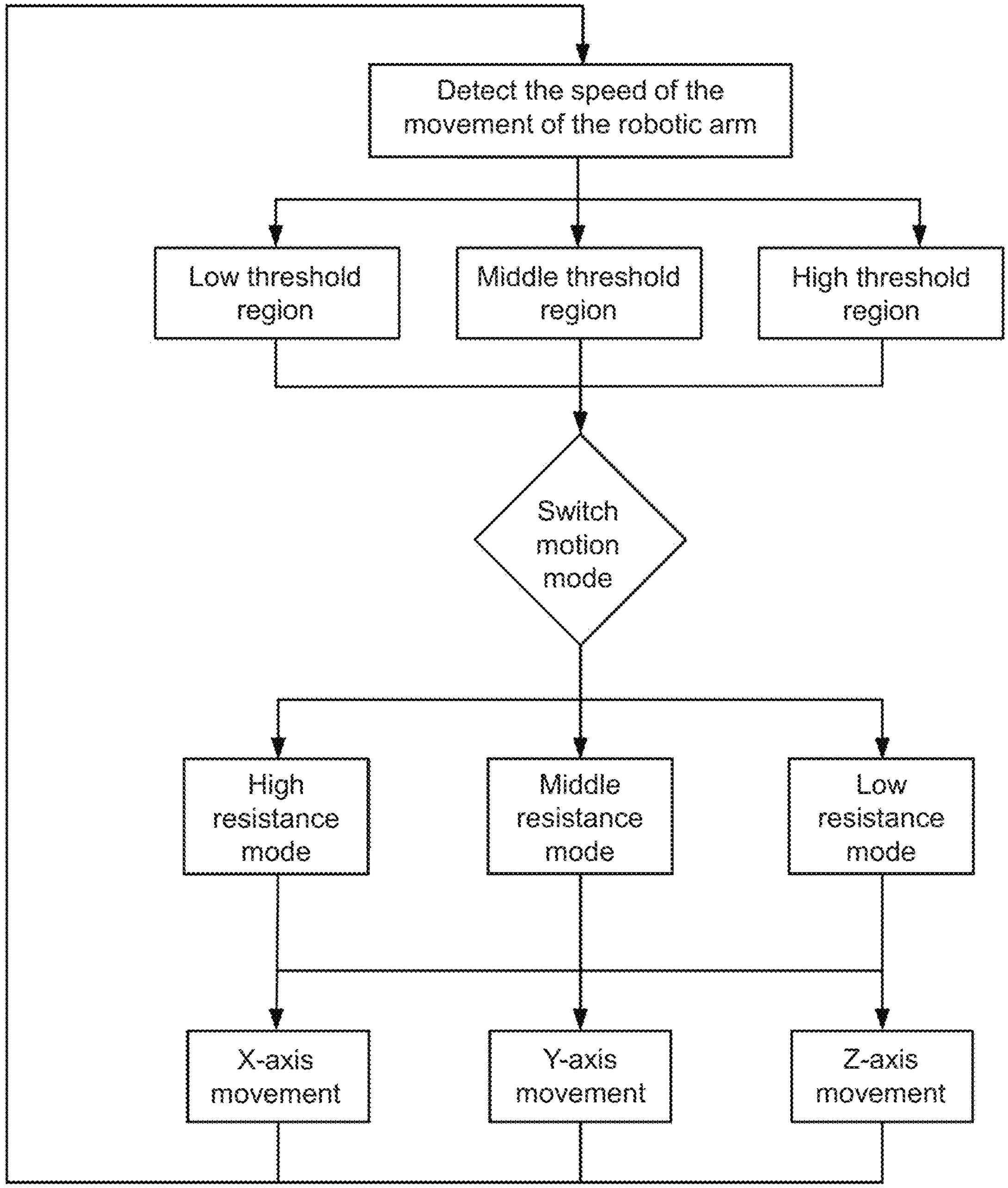
FIG. 6 is a flowchart of a method for controlling the resistance of a robotic arm according to the present invention.

Referring to FIG. 6, a flowchart of a method for controlling a resistance of a robotic arm according to the present invention is shown. The detection circuit 11 includes a speed sensor. The detection signal Sd is a speed signal. The detection circuit 11 detects the motion speed of the robotic arm 20 to generate the detection signal Sd. When the comparing circuit 12 determines that the detection signal Sd is at the low threshold region, the switching circuit 13 switches the robotic arm 20 to the first motion mode; when the comparing circuit 12 determines that the detection signal Sd is at the high threshold region, the switching circuit 13 switches the robotic arm 20 to the second motion mode. The first motion mode is a low-speed motion, and the second motion mode is a high-speed motion.

In comparison to the embodiments of FIGS. 3 and 5, FIG. 6 can additionally have a middle threshold region to differentiate between more speeds. Therefore, when the detection signal Sd is at the middle threshold region, this indicates that the robotic arm 20 is moving at a middle speed. The threshold regions from high to low respectively are high threshold region, middle threshold region, and low threshold region. Then, the switching circuit 13 controls the resistance generated by the motor inside the robotic arm 20 according to the comparison signal Sc. In other words, when the detection signal Sd is at the low threshold region, this indicates that the robotic arm 20 is at a low-speed motion, and the switching circuit 13 switches the robotic arm 20 to a high-resistance mode, that is, the switching circuit 13 switches the motor to remain at the low rotation speed and limits the robotic arm 20 to the low-speed motion, so that the robotic arm 20 can perform a motion with higher accuracy. When the detection signal Sd is at the high threshold region, this indicates that the robotic arm 20 is at a high-speed motion, and the switching circuit 13 switches the robotic arm 20 to a low-resistance mode, that is, the switching circuit 13 switches the motor to remain at the high rotation speed and limits the robotic arm 20 to the high-speed motion, so that the robotic arm 20 can perform a motion with lower accuracy. Therefore, the controller 10 and the motor can dynamically adjust the resistance of the motor according to different accuracy scenarios automatically, so that the operator can quickly drag the robotic arm 20 by hand according to the scenarios without operating additional control device. Thus, the teaching efficiency can be increased.

Figure 7:
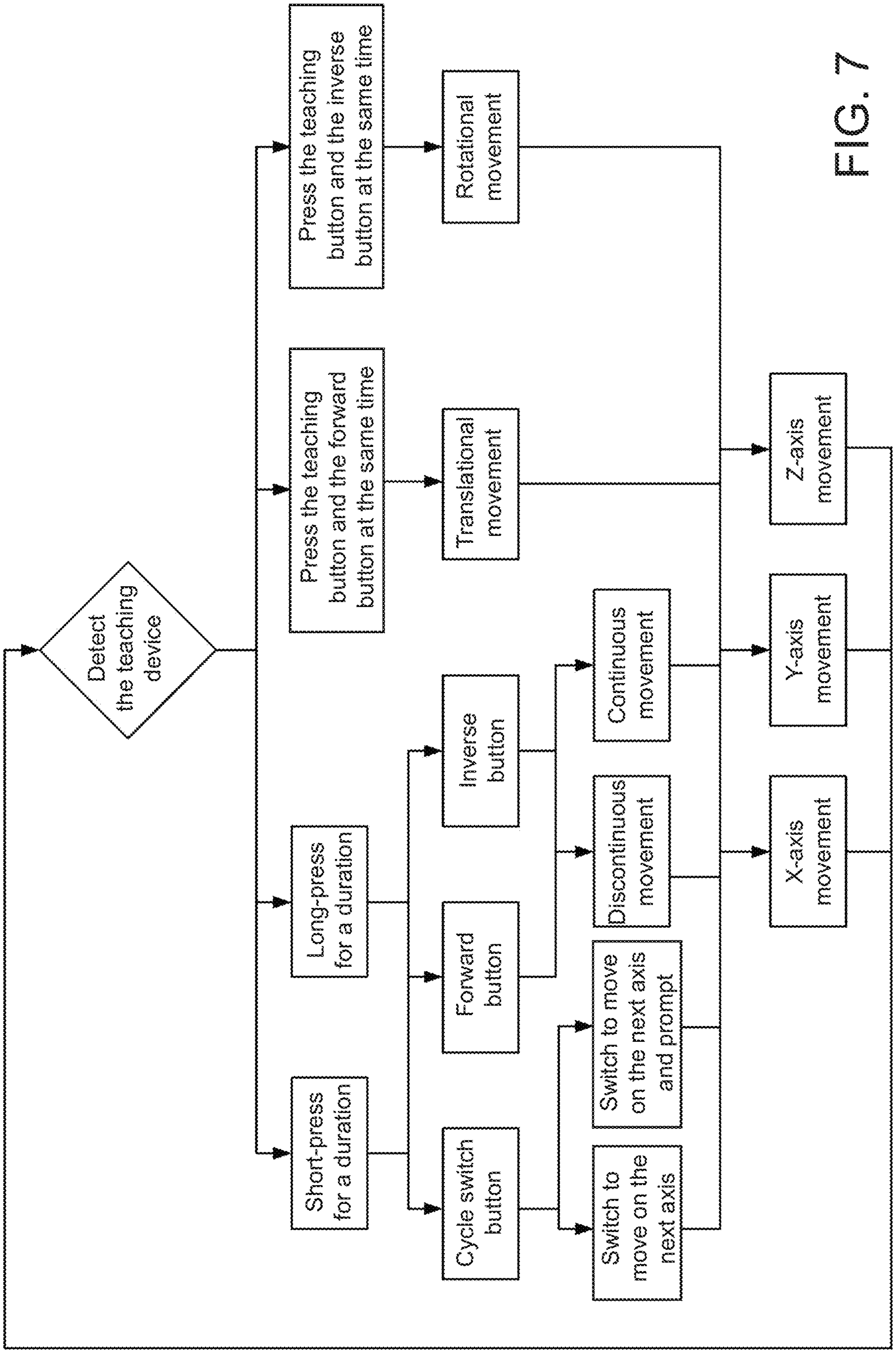
FIG. 7 is a flowchart of a teaching device for controlling the robotic arm according to the present invention.
Figure 8:
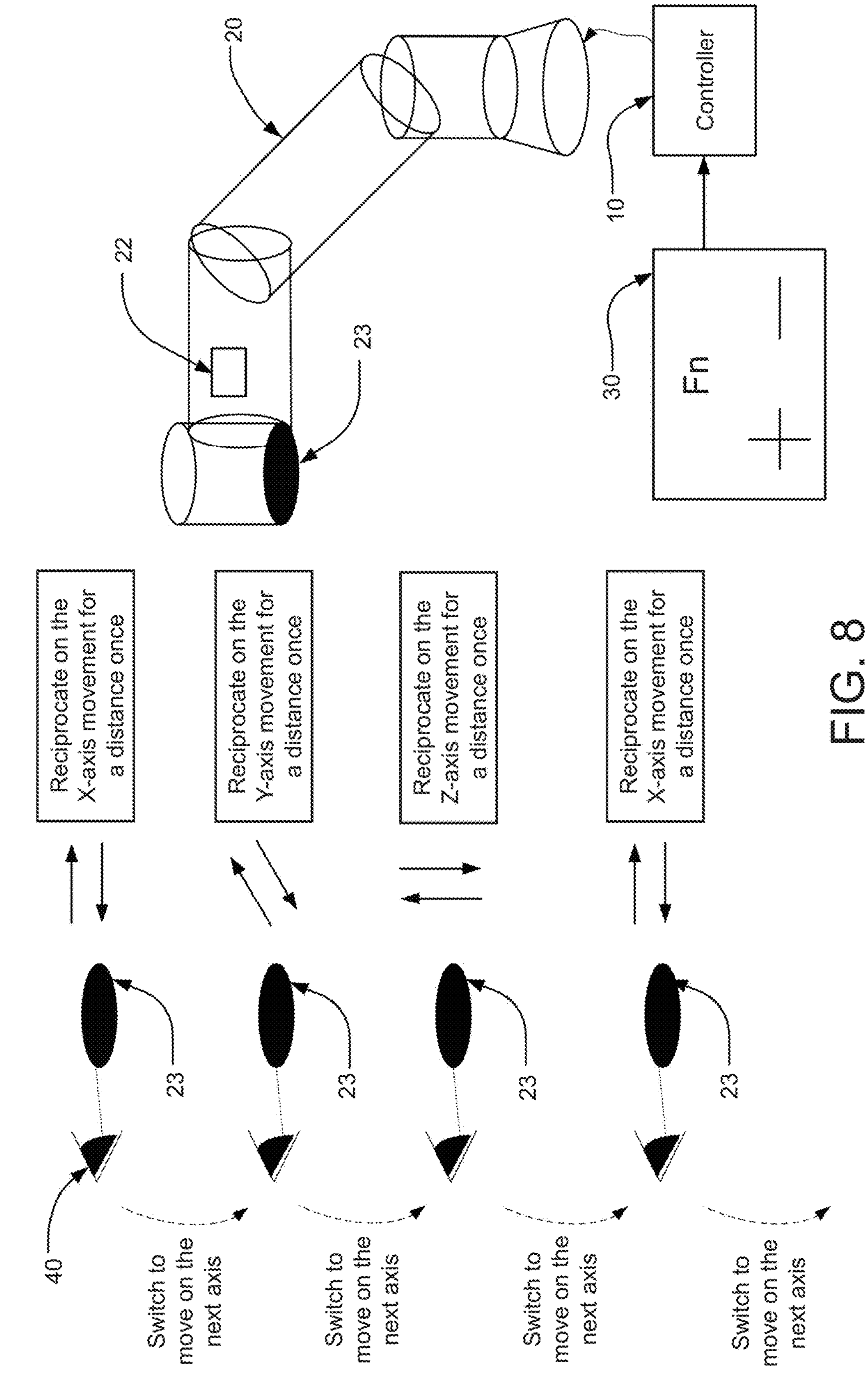
FIG. 8 is a schematic diagram of prompting the motion mode of the robotic arm according to the present invention.

Referring to FIG. 7, a flowchart of a teaching device according to the present invention for controlling a robotic arm is shown. Apart from the control method of a robotic arm disclosed in above embodiments, in which the operator directly drags the robotic arm 20 to complete the teaching process, a teaching device can be used to control the movement of the robotic arm 20 to complete the teaching process. Referring to FIG. 8, a schematic diagram of prompting the motion mode of the robotic arm according to the present invention is shown. As indicated in FIG. 8, a teaching device 30 is arranged to control the robotic arm 20, and the controller 10 is coupled to the teaching device 30 and the robotic arm 20 to control the robotic arm 20 according to an output of the teaching device 30. As disclosed above, the controller 10 can have a detection circuit 11, a comparing circuit 12 and a switching circuit 13 arranged therein. The teaching device 30 includes a forward button (+), a reverse button (−) and a cycle switch button (Fn). Thus, the detection circuit 11 detects the output of the teaching device 30 to generate the detection signal Sd. The comparing circuit 12 compares the detection signal Sd with the low threshold region and compares the detection signal Sd with the high threshold region to generate the comparison signal Sc. The switching circuit 13 switches the robotic arm 20 to the first motion mode or the second motion mode according to the comparison signal Sc.

Refer to FIG. 7 again. The detection circuit 11 is a timing circuit and the detection signal Sd is a timing signal; when teaching device 30 outputs a forward signal, that is, the operator presses the forward button (+), the detection circuit 11 to detect the change of the forward signal within a duration time to generate the detection signal Sd. When the comparing circuit 12 determines that the detection signal Sd is at the low threshold region, the switching circuit 12 switches the robotic arm 20 to the first motion mode. When the comparing circuit 12 determines that the detection signal Sd is at the high threshold region, the switching circuit 12 switches the robotic arm 20 to the second motion mode.

Therefore, the first motion mode is a forward motion with discontinuous movement, and the second motion mode is a forward motion with continuous movement. Within the duration time, when the operator short-presses the forward button (+), the detection circuit 11 detects that the forward signal maintains at the high level for a shorter duration. Conversely, within the duration time, when the operator long-presses the forward button (+), the detection circuit 11 detects that the forward signal maintains at the high level for a longer duration. Therefore, in the present embodiment, the low threshold region and the high threshold region are related to time and can be used to determine whether the operator short-presses or long-presses the teaching device 30.

Therefore, after whether the operator short-presses or long-presses forward button (+) within the duration time is determined, the switching circuit 13 can switch the robotic arm 20 to perform a discontinuous movement or a continuous movement. Then, the switching circuit 13 also can switch the robotic arm 20 to perform an X-axis movement X, a Y-axis movement Y or a Z-axis movement Z.

Moreover, when the teaching device 30 outputs a cycle switch signal, the detection circuit 11 detects the cycle switch signal within the duration time to generate a detection signal Sd. When the comparing circuit 12 determines that the detection signal Sd is at the low threshold region, the switching circuit 13 controls the robotic arm 20 to switch from the X-axis movement X to the Y-axis movement Y. When the comparing circuit 12 determines that the detection signal Sd is at the high threshold region, the switching circuit 13 controls the robotic arm 20 to switch from the X-axis movement X to the Y-axis movement Y, and the robotic arm 20 reciprocates on the Y-axis movement Y for a distance once. Therefore, if the detection circuit 11 detects that the operator short-presses the cycle switch button (Fn) within the duration time, the switching circuit 13 switches the robotic arm 20 to a movement on a different axis. Refer to FIG. 8. The initial setting of the robotic arm 20 is the X-axis movement X. When the operator short-presses the cycle switch button (Fn) once, the switching circuit 13 switches the robotic arm 20 to move on the next axis, that is, the robotic arm 20 switches from the X-axis movement X to the Y-axis movement Y. When the detection circuit 11 detects that the cycle switch button (Fn) is long-pressed within the duration time, the switching circuit 13 switches the robotic arm 20 to move on a different axis; furthermore, a terminal 23 of the robotic arm 20 is used to prompt the axis to which the robotic arm 20 is switched. As indicated FIG. 8, if the robotic arm 20 switches from the X-axis movement X to the Y-axis movement Y, the terminal 23 of the robotic arm 20 will reciprocate on the Y-axis for a distance once. Thus, when the operator watches 40 the terminal 23, the operator can obtain a prompt of the control result of the teaching device 30. Besides, the initial axial direction of the robotic arm 20 does not affect the cycle switch button (Fn). In the cycle control of switching from the X-axis movement X to the Y-axis movement Y, from the Y-axis movement Y to the Z-axis movement Z, and from the Z-axis movement Z to the X-axis movement X, the operator can set the initial state of the robotic arm 20.

Refer to FIGS. 7 and 8 again. The robotic arm 30 may further include a teaching button 22. When the detection circuit 11 receives a teaching signal and a forward signal of the forward button (+), the switching circuit 13 switches the robotic arm 20 to a translational movement; when the detection circuit 13 receives a teaching signal and an inverse signal of the reverse button (−), the switching circuit 13 switches the robotic arm 20 to a rotational movement. Thus, when the teaching button 22 and the forward button (+) are pressed at the same time, the switching circuit 13 switches the robotic arm 20 to a translational movement according to the output of the teaching device 30. When the teaching button 22 and the reverse button (−) are pressed at the same time, the switching circuit 13 switches the robotic arm 20 to a rotational movement according to the output of the teaching device 30. The translational movement and the rotational movement refer to the X-axis movement X, the Y-axis movement Y or the Z-axis movement Z being translational or rotational. Apart from the embodiments of FIG. 3 and FIGS. 5 and 6 in which the motion mode is switched according to the detection of the operation state of the robotic arm 20, the control method can further detect the output information of the teaching device 30 external to the robotic arm 20, then switch the motion mode of the robotic arm 20 by the teaching device 30 to simplify the teaching process of the operator and increase teaching accuracy.

To summarize, the control method of the robotic arm according to the present invention includes setting a detection circuit, a comparing circuit and a switching circuit. The detection circuit detects the motion of the robotic arm to generate a detection signal. The comparing circuit compares the detection signal with a low threshold region and compares the detection signal with a high threshold region to generate a comparison signal. The switching circuit switches the robotic arm to a first motion mode or a second motion mode according to the comparison signal.

The control method of a robotic arm according to the present invention includes setting a teaching device, a detection circuit, a comparing circuit and a switching circuit. The teaching device includes a forward button, a reverse button and a cycle switch button. The detection circuit detects an output of the teaching device to generate a detection signal. The comparing circuit compares the detection signal with a low threshold region and compares the detection signal with a high threshold region to generate a comparison signal. The switching circuit switches the robotic arm to the first motion mode or the second motion mode according to the comparison signal.

The detection circuit is an encoder, the detection signal is a speed signal, the detection circuit detects the motion speed of the robotic arm to generate the detection signal; when the comparing circuit determines that the detection signal is at the low threshold region, the switching circuit switches the robotic arm to the first motion mode; when the comparing circuit determines that the detection signal is at the high threshold region, the switching circuit switches the robotic arm to the second motion mode.

The first motion mode is a discontinuous movement or a low-speed motion, and the second motion mode is a continuous movement or a high-speed motion.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method of a robotic arm, comprising:

setting a teaching device, the teaching device comprising a forward button, a reverse button and a cycle switch button;

setting a detection circuit to detect an output of the teaching device to generate a detection signal;

setting a comparing circuit to compare the detection signal with a low threshold region and compare the detection signal with a high threshold region to generate a comparison signal; and setting a switching circuit to switch the robotic arm to a first motion mode or a second motion mode according to the comparison signal, wherein the detection circuit comprises a timing circuit, and the detection signal is a timing signal; when the teaching device outputs a forward signal, the detection circuit detects a level change of the forward signal within a duration time to generate the detection signal; when the comparing circuit determines that the detection signal is at the low threshold region, the switching circuit switches the robotic arm to the first motion mode; when the comparing circuit determines that the detection signal is at the high threshold region, the switching circuit switches the robotic arm to the second motion mode.

2. The control method of a robotic arm according to claim 1, wherein the first motion mode is a forward motion with a discontinuous movement, and the second motion mode is the forward motion with a continuous movement.

3. The control method of a robotic arm according to claim 1, wherein when the teaching device outputs a cycle switch signal, and the detection circuit detects a duration time of the cycle switch signal to generate the detection signal; when the comparing circuit determines that the detection signal is at the low threshold region, the switching circuit controls the robotic arm to switch from an X-axis movement to a Y-axis movement; when the comparing circuit determines that the detection signal is at the high threshold region, the switching circuit controls the robotic arm to switch from the X-axis movement to the Y-axis movement and the robotic arm reciprocates on the Y-axis movement for a distance once.

4. A control method of a robotic arm, comprising:

setting a teaching device, the teaching device comprising a forward button, a reverse button and a cycle switch button;

setting a detection circuit to detect an output of the teaching device to generate a detection signal;

setting a comparing circuit to compare the detection signal with a low threshold region and compare the detection signal with a high threshold region to generate a comparison signal;

setting a switching circuit to switch the robotic arm to a first motion mode or a second motion mode according to the comparison signal; and setting a teaching button, wherein when the detection circuit receives a teaching signal and a forward signal of the forward button, the switching circuit switches the robotic arm to a translational movement; when the detection circuit receives the teaching signal and an inverse signal of the reverse button, the switching circuit switches the robotic arm to a rotational movement.

* * * * *